United States Patent Office 3,350,355
Patented Oct. 31, 1967

3,350,355
RESINOUS CONDENSATION PRODUCT OF 2,2-DI(4-HYDROXYPHENYL)PROPANE DIALKYL-CARBAMATE AND FORMALDEHYDE
Charles H. Schramm and Morris Zief, Easton, Pa., assignors to J. T. Baker Chemical Company, Phillipsburg, N.J., a corporation of New Jersey
No Drawing. Filed June 26, 1964, Ser. No. 378,435
7 Claims. (Cl. 260—51)

ABSTRACT OF THE DISCLOSURE

Novel polyurethane resins which are a condensation product of formaldehyde and 2,2-di(4-hydroxyphenyl)propane dialkylcarbamate or 2,2-di(4-hydroxyphenyl)propane dicarbamate. Urea can be coreacted with the formaldehyde and said dialkylcarbamate to produce a polyurethane-polyurea resin. These resins can be used in coating, film, potting, encapsulating and molding applications.

This invention relates to polyurethane resins and to methods for their preparation. In a particular aspect this invention relates to thermoplastic and thermoset resins containing carbamate groups which are useful in coating and film-forming applications and in potting, encapsulating and molding uses.

It has been found that thermoplastic polyurethane resins having valuable properties for use as potting agents and coating mediums, and as flexibilizers for urea-formaldehyde resins are obtained by the interaction of 2,2-di-(4-hydroxyphenyl)propane dialkylcarbamate and formaldehyde. Illustrative of these novel thermoplastic materials are those prepared from 2,2-di(4-hydroxyphenyl)propane dimethylcarbamate and formaldehyde with acid catalysts:

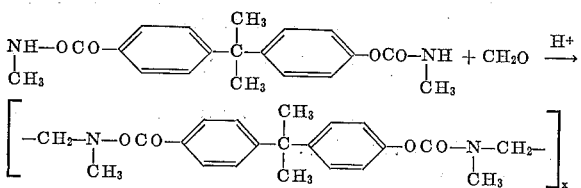

wherein x is an integer in a range defining the molecular weight of solid, thermoplastic polymers.

The substituted dicarbamate employed can be conveniently prepared by the reaction of monoalkylamine, e.g., wherein the alkyl group of the alkylamine contains between about 1 and 4 carbon atoms, with the dichlorocarbonate derivative of 2,2-di(4-hydroxyphenyl)propane (Bisphenol A).

The proportions of formaldehyde and 2,2di(4-hydroxyphenyl)propane dialkylcarbamate can be varied over a broad range. To obtain particularly useful thermoplastic resins, it is preferred to combine the reactants in a ratio between about 0.5 and 5 moles of formaldehyde per mole of 2,2-di(4-hydroxyphenyl)propane dialkylcarbamate.

The polymerization reaction can be conducted with either acid or base catalysts, preferably at a temperature in the range between about 70° C. and 150° C. The use of an acid catalyst favors a product with a linear structure and thermoplastic properties while a base catalyst such as potassium hydroxide or triethylenediamine favors the production of a cross-linked type of structure and the concomitant thermoset-like characteristics.

A particularly valuable class of polymers can be produced by including urea as a reactant in the preparation of polymers. For example, urea can be employed in the polymer preparation in an amount ranging between about 0.5 to 5 parts by weight of urea based on the weight of both the formaldehyde and 2,2-di(4-hydroxyphenyl)propane dialkylcarbamate in the presence of a basic catalyst such as ammonium hydroxide to produce a polyurethane-polyurea resin which forms clear, colorless films of good strength. Film formation can be accomplished by casting the resin from a solvent such as dimethylformamide. This type of resin is useful as a flexibilizer for urea-formaldehyde resins.

In another aspect of the present invention, higher melting, more thermoset-like resins can be produced by polymerizing together formaldehyde and 2,2-di(4-hydroxyphenyl)propane dicarbamate. This latter compound has the structure:

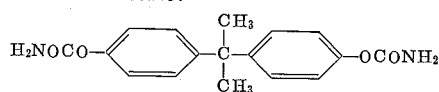

These resins which are produced in the same manner as described for the formation of the thermoplastic resins, substantially correspond to the structure:

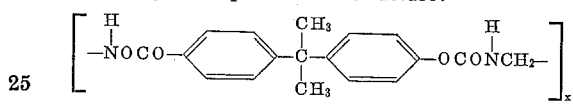

where one or both of the amino nitrogens, by interaction of the amino hydrogen with other molecules, can be further bound by cross-linking.

As illustrated in Example 4, the resins produced from 2,2-di(4-hydroxyphenyl)propane dicarbamate and formaldehyde tend to be cross-linked rather than linear and therefore do not have solubility in usual organic solvents. Resins of this type are useful for making molded articles by introduction of the resin into a mold in the form of an intermediate prepolymer and completing the cure at an elevated temperature.

Example 1

2,2-di(4 - hydroxyphenyl)propane dimethylcarbamate (19.9 grams, 0.06 mole), and paraformaldehyde (1.8 grams, 0.06 mole) in 120 milliliters of dimethylformamide were heated with 60 milliliters of concentrated hydrochloric acid at a temperature of 80° C. for two hours. The reaction mixture was poured into ice water and the precipitate which formed was separated. The dried, powdery resinous product weighed 18 grams and had a softening point of 142°–143° C. The resin was soluble in acetone, exylene, ethanol, dioxane, and benzene.

Upon heating, the resin yielded a clear liquid which cooled to a hard, clear solid. The thermoplastic material was melted and resolidified repeatedly without any change in its appearance. The resin had properties suitable for use as a potting medium.

Elemental analysis of the resin was consistent with the following structure:

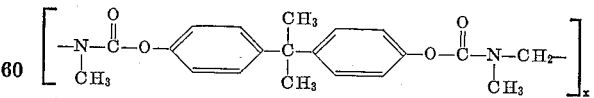

wherein x is an integer in a range defining the molecular weight of the resin.

Example 2

2,2-di(4 - hydroxyphenyl)propane dimethylcarbamate (10 grams, 0.03 mole), paraformaldehyde (0.9 gram, 0.03 mole), para-toluenesulfonic acid (25 milligrams), and 75 milliliters of benzene were refluxed in a vessel equipped with a Dean-Stark water removing device. After a four hour reflux period the benzene was removed in vacuo. The heavy residual syrup was dissolved in hot dimethylformamide and the solution was poured into water.

The resulting precipitate was recovered and dried (9 grams). It had a softening point of 245° C. The product was soluble in dimethylformamide, ethanol, dioxane, and benzene.

*Example 3*

2,2-di(4 - hydroxyphenyl)propane dimethylcarbamate (3 grams), 37 percent formaldehyde solution (3 grams), and 30 percent ammonium hydroxide (1 gram) were heated together to form a clear solution. Urea (9 grams) was added, and the reaction mixture was heated for three hours at a temperature of 95° C. The reaction mixture was concentrated by distillation in vacuo and the resulting residue was dissolved in dimethylformamide. Evaporation of the produce solution yielded a clear, rubbery, flexible resin.

In a control experiment, a highly cross-linked product, insoluble in dimethylformamide, was produced when 2,2-di(4-hydroxyphenyl)propane dimethylcarbamate was not included as a reactant.

*Example 4*

Phosgene (50 grams, 0.5 mole) in 200 milliliters of toluene, 2,2 - di(4 - hydroxyphenyl)propane (57 grams, 0.25 mole) in 1.25 milliliters of acetone, and triethylamine (50 grams, 0.5 mole) were mixed together with stirring. The reaction mixture was heated at a temperature of 60° C. for thirty minutes. Then it was cooled and filtered to remove solid material. The filtrate was concentrated in vacuo to remove volatile components, and the resulting concentrate was then poured into dilute ammonium hydroxide containing an emulsifier. The precipitate which resulted was recovered, dried, and recrystallized from ethanol yielding about 35 grams of 2,2-di(4 - hydroxyphenyl)propane dicarbamate, melting point 163°–167° C. The alkyl derivatives of the dicarbamate can be prepared by substituting a monoalkylamine for the ammonium hydroxide in the process of this example.

Forty milliliters of cencentrated hydrochloric acid was added to a solution of 2,2-di(4-hydroxyphenyl)propane dicarbamate (1.5 grams, 0.005 mole), para-formaldehyde (0.15 grams, 0.005 mole) in 10 milliliters of dimethylformamide at a temperature of 90° C. The reaction mixture was heated for five hours at a temperature of 100° C. The precipitate which formed during the reaction period was filtered off, washed with water, and dried (1.4 grams), softening point 226°–235° C. Elemental and infrared spectral analyses were consistent with the following structure:

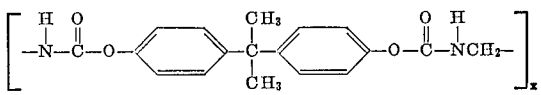

with some degree of cross-linking through the amino nitrogen atoms being present. Under the alkaline conditions, cross-linking through methylene bridges between the phenyl groups is also present.

We claim:

1. A thermoplastic polyurethane resin which is a condensation product of 2,2-di(4-hydroxyphenyl)propane dialkylcarbamate and formaldehyde in a molar ratio of about 0.5 to 5 moles of formaldehyde for each mole of said carbamate.

2. A resin of claim 1 wherein the dialkylcarbamate is dimethylcarbamate.

3. A thermoplastic polyurethane-polyurea resin which is a condensation product of 2,2-di(4-hydroxyphenyl)propane dialkylcarbamate, formaldehyde and urea in a molar ratio of 0.5 to 5 moles of formaldehyde for each mole of said carbamate and about 0.5 to 5 parts by weight of urea based on the weight of both the formaldehyde and carbamate.

4. A resin of claim 3 wherein the dialkylcarbamate is dimethylcarbamate.

5. A thermoset polyurethane resin which is a condensation product of 2,2-di(4-hydroxyphenyl)propane dicarbamate and formladehyde in a molar ratio of about 0.5 to 5 moles of formaldehyde for each mole of said carbamate.

6. A polymerization process which comprises reacting together 2,2 - di(4 - hydroxyphenyl)propane dialkylcarbamate and formaldehyde to produce a thermoplastic polyurethane resin in a molar ratio of about 0.5 to 5 moles of formaldehyde for each mole of said carbamate.

7. A polymerization process which comprises reacting together 2,2 - di(4 - hydroxyphenyl)propane dicarbamate and formaldehyde to produce a thermoset polyurethane resin in a molar ratio of about 0.5 to 5 moles of formaldehyde for each mole of said carbamate.

No references cited.

WILLIAM H. SHORT, *Primary Examiner.*

L. LEE, *Assistant Examiner.*